US008447072B2

(12) United States Patent
Takahashi et al.

(10) Patent No.: US 8,447,072 B2
(45) Date of Patent: May 21, 2013

(54) INATTENTION DETERMINING DEVICE

(75) Inventors: Akio Takahashi, Shioya-gun (JP);
Shinsuke Ueda, Utsunomiya (JP);
Seiichi Yamamoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 112 days.

(21) Appl. No.: 13/221,001

(22) Filed: Aug. 30, 2011

(65) Prior Publication Data
US 2012/0057749 A1    Mar. 8, 2012

(30) Foreign Application Priority Data

Sep. 3, 2010  (JP) ................. 2010-198167

(51) Int. Cl.
*G06K 9/00*    (2006.01)

(52) U.S. Cl.
USPC ........................................... 382/103; 701/28

(58) Field of Classification Search
None
See application file for complete search history.

(56) References Cited

U.S. PATENT DOCUMENTS

| 8,344,894 | B2 * | 1/2013 | Szczerba et al. | 340/576 |
| 2002/0140562 | A1 | 10/2002 | Gutta et al. | |
| 2005/0030184 | A1 * | 2/2005 | Victor | 340/576 |
| 2010/0025144 | A1 * | 2/2010 | Huang et al. | 180/401 |
| 2010/0039249 | A1 * | 2/2010 | Schmitz et al. | 340/439 |

FOREIGN PATENT DOCUMENTS

| DE | 102009005730 |   | 7/2010 |
| JP | 2005-063105 | A | 3/2005 |
| JP | 2005-063105 | * | 10/2005 |
| JP | 2007-230491 | A | 9/2007 |
| JP | 2007-310455 | * | 11/2007 |
| JP | 2009-294753 | * | 12/2009 |
| JP | 2010-257293 | A | 11/2010 |

OTHER PUBLICATIONS

Translation of Akira et al., JP Patent Publication 2005-063105 A, "Device for determining inattentive driving", Translation Obtained online via PAJ on Feb. 8, 2013.*
Translation of Kiyoyuki, JP Patent Publication 2009-294753 A, "Image processor and image processing method", Translation Obtained online via PAJ on Feb. 8, 2013.*
Translation of Masaki, JP Patent Publication 2007-310455, "Information providing apparatus for vehicle", Translation obtained online via PAJ on Feb. 8, 2013.*
Japanese Office Action, Application No. 2010-198167 dated Aug. 28, 2012, 8 pages.

* cited by examiner

*Primary Examiner* — Bhavesh Mehta
*Assistant Examiner* — Tahmina Ansari
(74) *Attorney, Agent, or Firm* — Rankin, Hill & Clark LLP

(57) ABSTRACT

An inattention determining device includes range changing unit and inattention determining unit. When a curve detection result is output from curve detector, the range changing unit changes a first predetermined range to a second predetermined range by the predetermined amount in the curve direction before a turning direction of an acquisition result is changed in the curve direction of the curve detection result. The inattention determining unit determines whether or not a driver is in an inattention state on the basis of the second predetermined range.

8 Claims, 3 Drawing Sheets

INATTENTION DETERMINING DEVICE

BACKGROUND OF THE INVENTION

1. Field of the Invention

Priority is claimed on Japanese Patent Application No. 2010-198167, filed Sep. 3, 2010, the contents of which are incorporated herein by reference.

The present invention relates to an inattention determining device.

2. Description of Related Art

A face direction angle is detected on the basis of a face image obtained by capturing an image of a driver's face. A device, which changes an angle threshold value as reference when determining inattention using the face direction angle on the basis of the velocity of a vehicle, a yaw rate, or a lateral acceleration according to a driving state (for example, a curve driving state) of the vehicle, is described in Japanese Unexamined Patent Application, First Publication No. 2009-294753.

According to the device of the related art, after detecting the yaw rate or the lateral acceleration generated when the driving state of the vehicle is actually changed, the angle threshold value is changed.

However, the driver generally performs an action of visually checking a forward turning direction from a state of driving straight on a straight path before entering the curve. Accordingly, when the angle threshold value is changed after entering the curve as the technique described in the related art, the change of the angle threshold value occurs too late, and the determination of inattention is incorrectly performed. That is, the device of the related art may erroneously determine that the state of visually checking the turning direction of the forward curve in the state of driving straight on the straight way before entering the curve is an inattention state.

It is desirable to provide an inattention device capable of appropriately determining inattention of a driver.

SUMMARY OF THE INVENTION

To solve the problem, the inattention determining device according to the invention employs the following means.

According to a first aspect of the invention, there is provided an inattention determining device including: an imaging unit which captures an image of a face of a driver in a vehicle and outputting a face image; a sight line direction detector which detects a sight line direction of the driver from the face image and outputs a sight line detection result; an inattention determining unit which determines that the driver is in an inattention state when the sight line direction of the sight line detection result is out of a first predetermined range; an information acquiring unit which acquires information of driving behavior including a turning direction of the vehicle and outputs a driving behavior acquisition result; a range changing unit which changes the first predetermined range to a second predetermined range by a predetermined amount on the basis of the driving behavior acquisition result; and a curve detector which detects an existence of a curve to the front within a predetermined distance from the vehicle and a curve direction of the curve, and outputs a curve detection result, wherein when the curve detection result is output from the curve detector, the range changing unit changes the first predetermined range to the second predetermined range by the predetermined amount in the curve direction before the turning direction of the driving behavior acquisition result is changed to the curve direction of the curve detection result, and wherein the inattention determining unit determines whether or not the driver is in the inattention state on the basis of the second predetermined range.

According to the inattention determining device described in the first aspect, the first predetermined range for determining the inattention state of the driver is changed by a predetermined amount at the timing before the behavior of the vehicle is changed and the turning direction of the vehicle is changed to the curve direction. Since the first predetermined range is changed to the second predetermined range before the vehicle is changed to the curve direction, it is possible to prevent the change of the first predetermined range from occurring late. Accordingly, it is possible to prevent the inattention determining device from erroneously determining that the state where the driver visually checks the turning direction of the curve is the inattention state, at the timing before the vehicle enters the curve to the front.

According to a second aspect of the invention, in the inattention determining device described in the first aspect, it is preferable that when the curve detection result is output from the curve detector, the range changing unit changes the first predetermined range to the second predetermined range before the turning direction of the driving behavior acquisition result is changed in the curve direction of the curve detection result and when the sight line direction of the sight line detection result is directed from the first predetermined range to the outside of the first predetermined range on the curve direction side.

According to the inattention determining device described in the second aspect, the first predetermined range for determining the inattention state of the driver is changed to the second predetermined range by a predetermined amount, when the sight line direction deviates from the first predetermined range on the curve direction side, before the behavior of the vehicle is changed and the turning direction of the vehicle is changed to the curve direction. Accordingly, it is possible to change the first predetermined range at the proper timing. Therefore, it is possible to improve precision of determination whether or not the driver is in the inattention state.

According to a third aspect of the invention, in the inattention determining device described in the first or second aspect, it is preferable that the information acquiring unit further acquires the information of the driving behavior including a wheel steering angle of the vehicle and outputs a wheel steering angle acquisition result, and when the wheel steering angle of the wheel steering angle acquisition result is equal to or more than a predetermined value, the inattention determining unit discontinues determining whether or not the driver is in the inattention state.

First, when the wheel steering angle is equal to or more than the predetermined value, the possibility that the sight line direction is greatly changed by an external view operation of the driver is high. According to the inattention determining device described in the third aspect, the determination whether or not the driver is in the inattention state is discontinued when the wheel steering angle is equal to or more than the predetermined value while driving, and thus the determination is prevented from being incorrectly performed. Therefore, it is possible to improve precision of determination whether or not the driver is in the inattention state.

According to a fourth aspect of the invention, it is preferable that the inattention determining device described in the first or second aspect further includes: a display which displays a predetermined image on a windshield of the vehicle; a position estimating unit which estimates a relative position of the vehicle with respect to the curve and outputs an estimation result when the curve detection result is output; and a reference point calculating unit which calculates a reference point for the driver to view on the windshield of the vehicle on the basis of the curve direction of the curve detection result and the relative position of the vehicle and outputs a calculation result, wherein the display displays the predetermined image representing the reference point of the calculation result when the curve detection result is output.

According to the inattention determining device described in the fourth aspect, the driver can recognize whether or not the first predetermined range for determining the inattention state of the driver is changed according to whether or not there is a curve. Accordingly, it is possible to prompt the drive through visual guidance to a proper viewing position when entering the curve and passing through the curve.

According to a fifth aspect of the invention, in the inattention determining device described in the fourth aspect, it is preferable that the reference point calculating unit calculates a contact point between a line that passes through the relative position of the vehicle and an inner circumference of the curve and defines the contact point as the reference point.

According to the inattention determining device described in the fifth aspect, it is possible to prompt visual guidance to a proper viewing position at the time of entering the curve and passing through the curve.

DETAILED DESCRIPTION OF THE INVENTION

Hereinafter, an embodiment of an inattention determining device of the invention will be described with reference to the accompanying drawings.

Figure 1:
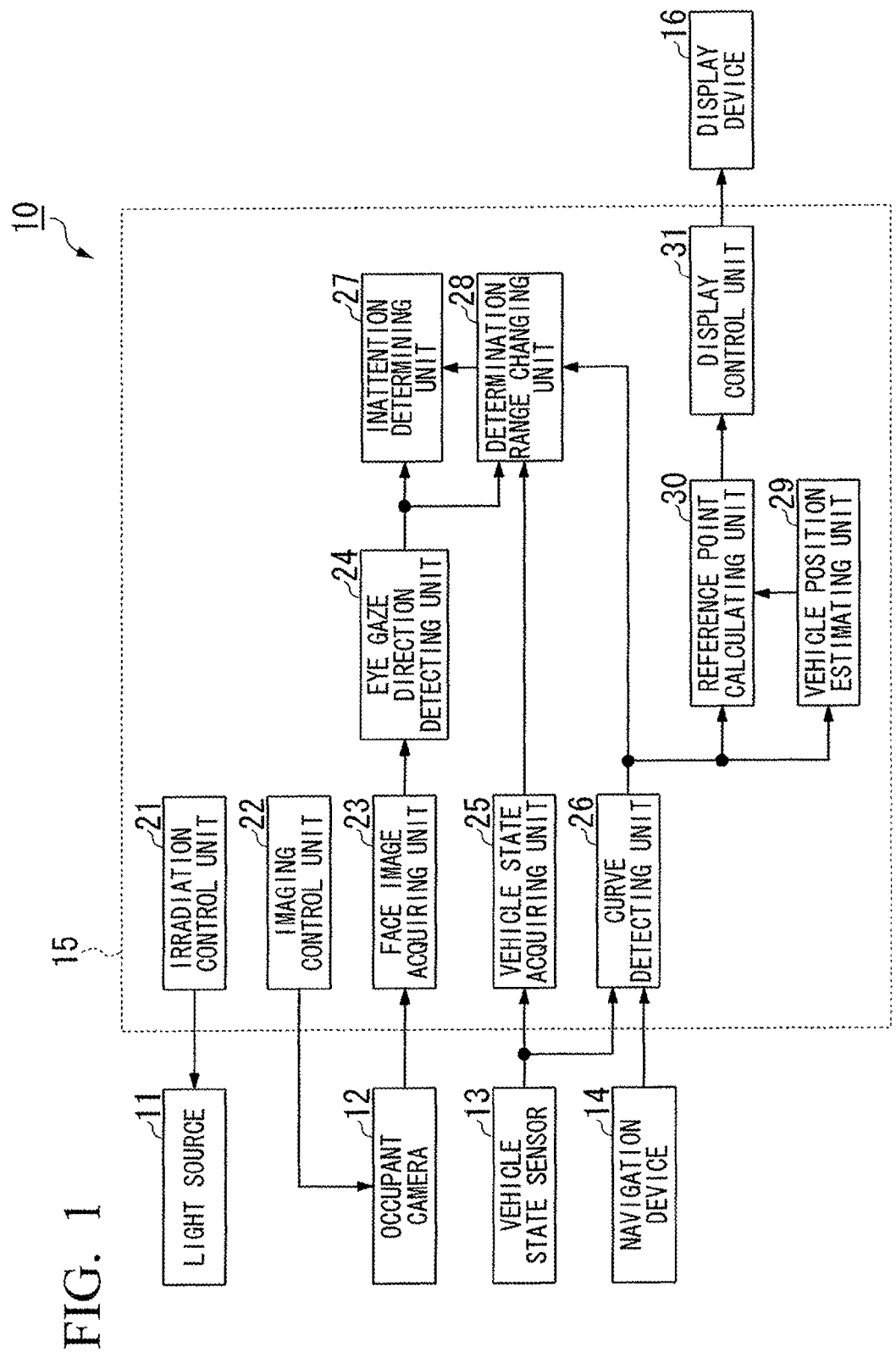
FIG. 1 is a diagram illustrating a configuration of an inattention determining device according to an embodiment of the invention.

For example, as shown in FIG. 1, the inattention determining device 10 according to the embodiment includes a light source 11, an occupant camera 12, a vehicle state sensor 13, a navigation device 14, a processing device 15, and a display device 16.

The light source 11 irradiates an imaging target (for example, the face of a driver seated in the driver's seat) with light such as visible light or infrared rays.

The occupant camera 12 captures at least an image of the face of the driver seated in the driver's seat as the imaging target, for example, in the visible light region or the infrared region including an imaging area, and outputs a face image including the face of the driver.

The vehicle state sensor 13 includes, for example, a vehicle velocity sensor, a gyro sensor, a yaw rate sensor, and a steering angle sensor. The vehicle velocity sensor detects the velocity (vehicle velocity) of the vehicle itself. The gyro sensor detects a posture of a vehicle body or a direction of movement. The yaw rate sensor detects a yaw rate (rotation angle velocity of axial rotation in the up and down direction of a gravity center of the vehicle). The steering angle sensor detects a steering angle of a steering wheel operated by the driver or a real steering angle (wheel steering angle) according to the steering angle of the steering wheel. The vehicle state sensor 13 outputs a signal of the detection result of various kinds of vehicle information (in fact, vehicle velocity, posture, yaw rate, steering angle, wheel steering angle and the like) to the processing device 15.

The navigation device 14 receives a positioning signal such as a GPS (Global Positioning System) signal for measuring the position of the vehicle itself using artificial satellites, and calculates the current position of the vehicle itself on the basis of the positioning signal.

The navigation device 14 calculates the current position of the vehicle itself by a calculation process of autonomous navigation based on the detection signals of the velocity (vehicle velocity) and the yaw rate of the vehicle itself output from the vehicle velocity sensor and the yaw rate sensor (not shown) of the vehicle state sensor 13.

The navigation device 14 is provided with map displaying data and road coordinate data, as map data. The map displaying data is data for displaying a map on a display screen of the display device 16, and the road coordinate data is data necessary for a map matching process based on the current position of the vehicle itself.

The navigation device 14 is provided with data necessary for a process such as route search or route guide, as the map data. The data are road data, for example, a node that is the coordinates formed of latitude and longitude of a predetermined position such as an intersection and a junction, a link connecting nodes to each other, a distance between links, and a shape (for example, information about the radius of curvature of a curve), a width, an intersection angle, and a kind of road, and the like.

The processing device 15 includes, for example, an irradiation control unit 21, an imaging control unit 22, a face image acquiring unit 23, a sight line direction detecting unit 24, a vehicle state acquiring unit 25, a curve detecting unit 26, an inattention determining unit 27, a determination range changing unit 28, a vehicle position estimating unit 29, a reference point calculating unit 30, and a display control unit 31.

The irradiation control unit 21 controls irradiation of light of the light source 11.

The imaging control unit 22 controls imaging of the occupant camera 12.

The face image acquiring unit 23 acquires the face image output from the occupant camera 12.

The sight line direction detecting unit 24 performs a recognition process such as calculation of characteristics and determination of shapes on the left and right eyes of the driver from the face image acquired by the face image acquiring unit 23 as the detection target object. The sight line direction and the gaze point of the driver are detected by a predetermined sight line detecting process using, for example, a center position of the irises and pupils of the eyes, a center position of a Purkinje image that is a reflection image of infrared rays on the cornea surface, a center position of the eyeballs, and positions of edges of eyelids, on the basis of the result of the recognition process.

The vehicle state acquiring unit 25 acquires vehicle information about various states of the vehicle itself on the basis of the signals of the various detection results output from the vehicle state sensor.

For example, the vehicle state acquiring unit 25 acquires information of the velocity (vehicle velocity) of the vehicle itself, a posture of the vehicle body, a direction of movement, a turning direction, and a real steering angle (wheel steering angle) according to a steering angle of a steering wheel, as the information of the driving behavior of the vehicle itself.

The curve detecting unit 26 detects whether or not there is a curve (an existence of a curve) to the front within a predetermined distance (for example, a distance within 2 seconds until reaching an entrance of a curve) from the vehicle itself and detects a curve direction of the curve, for example, on the basis of the road data of the navigation device 14, or any one of the steering angle of the steering wheel and the real steering angle (wheel steering angle) according to the steering angle of the steering wheel output from the vehicle state sensor 13. Accordingly, the curve detecting unit 26 detects switching of curves, for example, with respect to continuous curves in which a plurality of curves are continuous.

The curve detecting unit 26 may detect a curve, for example, on the basis of an image output from an external camera (not shown) capturing an image of outwards of the vehicle itself, and may detect a curve, for example, on the basis of information about a driving way received from the outside.

The inattention determining unit 27 determines whether or not a duration when the sight line direction of the driver detected by the sight line direction detecting unit 24 is a direction in the range other than the first predetermined range is equal to or more than a predetermined time. That is, the inattention determining unit 27 determines whether or not the duration when the sight line direction is in an inattention determination range that is out of a non-inattention determination range is equal to or more than the predetermined time.

Specifically, when a state where an angle (for example, an angle of a sight line direction based on the front face direction of the driver seated in the driver's seat) of the sight line direction of the driver deviates from a predetermined non-inattention angle range regulating the non-inattention determination range is kept for a predetermined time (for example, 2 seconds) or more, the inattention determining unit 27 determines that the driver is inattentive, and outputs a signal of the determination result.

Meanwhile, if the angle of the sight line direction of the driver is within the predetermined non-inattention angle range, the inattention determining unit 27 determines that the driver is not inattentive. The inattention determining unit 27 outputs a signal of the determination result.

When the steering angle of the steering wheel acquired by the vehicle state acquiring unit 25, or the real steering angle (wheel steering angle) according to the steering angle of the steering wheel is equal to or more than a predetermined value (for example, 8°), the inattention determining unit 27 discontinues determining whether or not the driver is in the inattention state.

The determination range changing unit 28 outputs an instruction to change the non-inattention determination range by a predetermined amount on the basis of the vehicle information acquired by the vehicle state acquiring unit 25, the presence of the curve detected by the curve detecting unit 26 and the curve direction of the curve, and the sight line direction detected by the sight line direction detecting unit 24.

For example, when there is a curve to the front within a predetermined distance from the vehicle itself and when the curve direction of the curve is detected by the curve detecting unit 26, the determination range determining unit 28 changes the non-inattention determination range in the curve direction by a predetermined amount at a predetermined timing before the turning direction of the vehicle itself acquired by the vehicle state acquiring unit 25 is changed to the curve direction.

For example, the predetermined timing before the turning direction of the vehicle itself is changed to the curve direction is the time when the sight line direction detected by the sight line direction detecting unit 24 deviates from the non-inattention determination range set at this time point on the curve direction side and is directed to the range outside the non-inattention determination range.

Figure 2:
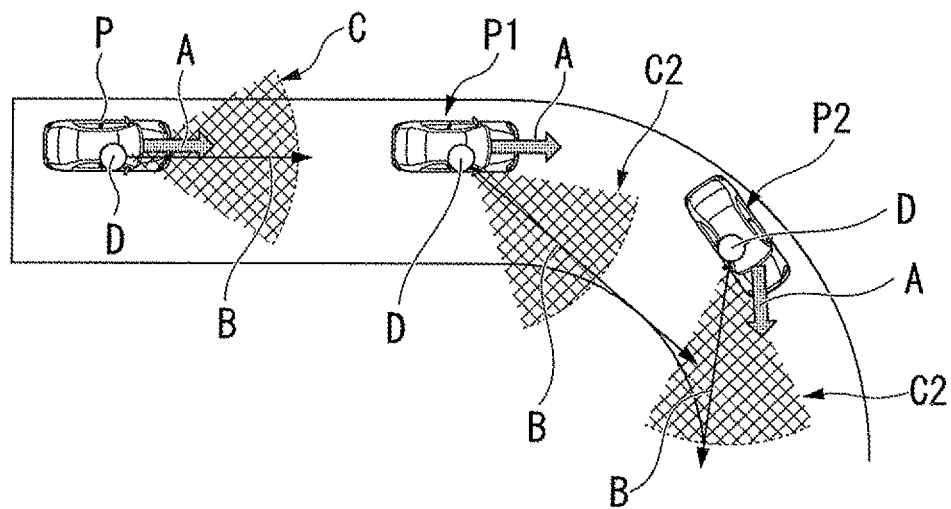
FIG. 2 is a diagram illustrating an example of a non-inattention determining range changed by the inattention determining device according to the embodiment of the invention and a sight line direction of a driver.

For example, as shown in FIG. 2, when there is a curve to the front of the direction of movement of the vehicle P itself, the determination range changing unit 28 changes the non-inattention determination range (the first predetermined range) C to the non-inattention determination range (the second predetermined range) C2 in the curve direction by a predetermined amount, according to the change of the sight line direction B of the driver D in the curve direction, even when the wheel steering direction A is invariable (e.g., a state of driving straight), at the front position (P1) before the curve at the timing before the vehicle P itself enters the curve.

Meanwhile, for example, when the non-inattention determining range C is changed to the non-inattention determination range C2 in the curve direction according to the change of the wheel steering direction A in the curve direction at the position (P2) where the vehicle P itself passes through the curve at the timing after the vehicle P itself enters the curve, the change from the non-inattention determination range C to the non-inattention determination range C2 is late. Accordingly, by changing the non-inattention determination range C to the non-inattention determination range C2 in the curve direction by a predetermined amount at the front position P1 of the curve, it is possible to prevent the change from the non-inattention determining range C to the non-inattention determination range C2 from occurring late.

The predetermined amount of changing the non-inattention determination range in the curve direction may be a fixed value, and a variable value changed according to the curve detected by the curve detecting unit 26 or a variable value changed according to the steering angle or the wheel steering angle acquired by the vehicle state acquiring unit 25.

Figure 3:
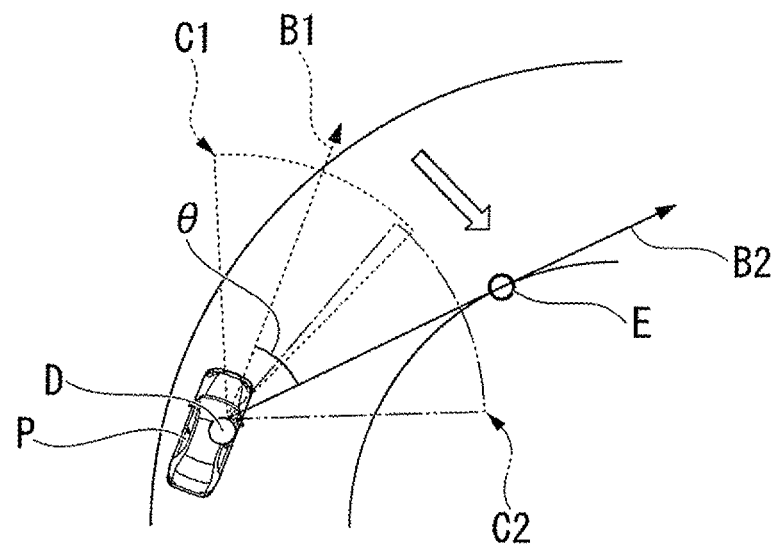
FIG. 3 is a diagram illustrating an example of the non-inattention determining range changed by the inattention determining device according to the embodiment of the invention.

When the predetermined amount is changed according to the shape of the curve detected by the curve detecting unit 26, the determination range changing unit 28, for example, as shown in FIG. 3, sets a predetermined amount (for example, a predetermined angle θ) of changing the non-inattention determination range C1 with respect to the sight line direction B1 in the curve direction such that the non-inattention determination range C2 after the changing includes the sight line direction B2 coming in contact with the inner circumference of the curve. For example, the sight line direction B2 coming in contact with the inner circumference of the curve coincides with the center line of the non-inattention determination range C2.

Figure 4:
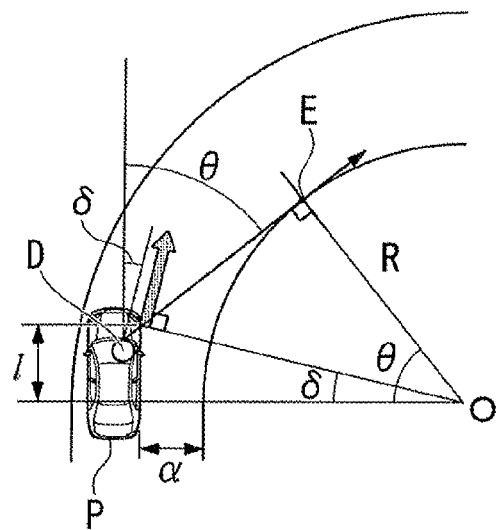
FIG. 4 is a diagram illustrating an example of a predetermined angle of the non-inattention determining range changed by the inattention determining device according to the embodiment of the invention.

For example, when the predetermined amount is changed according to the wheel steering angle δ of the front wheels of the vehicle P itself acquired by the vehicle state acquiring unit 25, the determination range changing unit 28, for example, as shown in FIG. 4, sets the predetermined amount (e.g., a predetermined angle θ) on the basis of a radius of curvature R of the curve, a distance α from the vehicle end of the vehicle P itself to the shoulder of the road, which is considered as a predetermined fixed value, and the given wheelbase 1 of the vehicle P itself, for example, as shown in FIG. 4.

That is, in the following formula (1), when the radius of curvature R is larger than the wheelbase 1, the following formula (2) is satisfied. In addition, the following formula (3) is led from the following formula (2).

Accordingly, the determination range changing unit 28 calculates the predetermined angle θ on the basis of the wheel steering angle δ, the distance α, and the wheelbase 1 as shown in the following formula (4), on the basis of the following formula (3).

[Formula 1]
$$\tan\delta = \frac{l}{R+\alpha} \quad (1)$$

[Formula 2]
$$\delta = \frac{l}{R+\alpha}(R \gg l) \quad (2)$$

[Formula 3]
$$R = \frac{l}{\delta} - \alpha \quad (3)$$

[Formula 4]
$$R = \frac{l}{\delta} - \alpha \quad (3)$$

When the curve detecting unit 26 detects that there is a curve to the front within a predetermined distance from the vehicle itself, the vehicle position estimating unit 29 estimates a relative position of the vehicle itself with respect to the curve.

The reference point calculating unit 30 calculates a reference point (e.g., the contact point E shown in FIG. 5) for the driver to view on the windshield of the vehicle itself on the basis of the curve direction detected by the curve detecting unit 26 and the relative position of the vehicle itself estimated by the vehicle position estimating unit 29.

For example, as shown in FIG. 3 and FIG. 4, the reference point is the contact point E between the straight line B2 and the inner circumference of the curve when the straight line B2 (for example, the sight line of the driver) including the relative position (for example, the positions of the eyes of the driver seated in the driver's seat) of the vehicle itself of the estimation result estimated by the vehicle position estimating unit 29 becomes the tangent line of the inner circumference of the curve.

The display control unit 31 controls the display device 16 when the detection result representing the presence of the curve is output by the curve detecting unit 26. The display control unit 31 displays a predetermined image representing the gaze point according to the sight line direction of the driver detected by the sight line direction detecting unit 24, and a predetermined image representing the reference point calculated by the reference point calculating unit 30, on the windshield of the vehicle.

Figure 5:
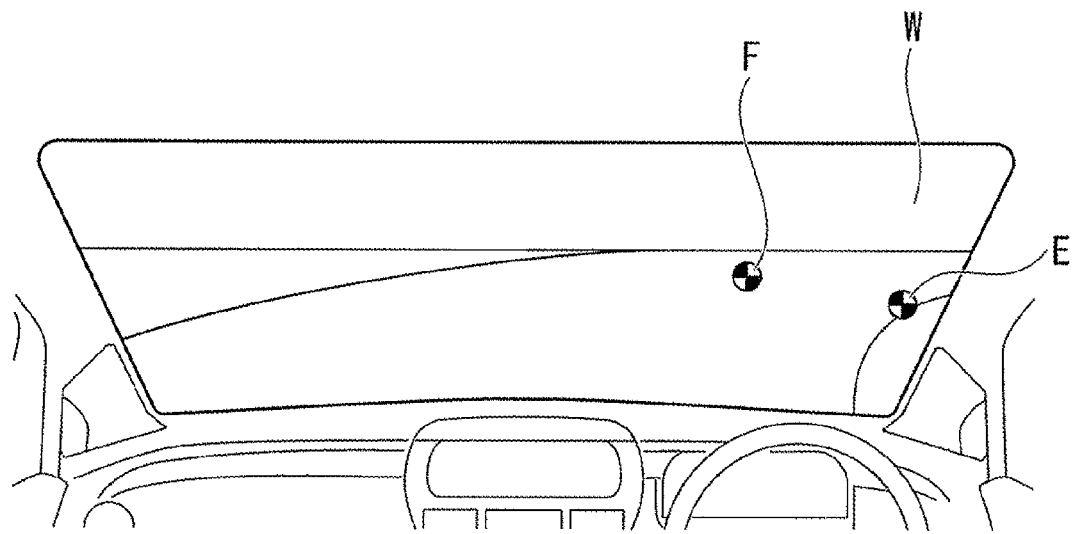
FIG. 5 is a diagram illustrating an example of a gaze point and a reference point displayed on a windshield by the inattention determining device according to the embodiment of the invention.

For example, as shown in FIG. 5, the display device 16 is a head-up display and the like in which the front window W of the vehicle is the display screen.

The display device 16 performs displaying on the front window W to form a virtual image (for example, a circular image) of each predetermined image at the position of the gaze point (for example, the gaze point F shown in FIG. 5) according to the sight line direction of the driver detected by the sight line direction detecting unit 24, and the position of the reference point (for example, the contact point E shown in FIG. 5) calculated by the reference point calculating unit 30.

As described above, according to the inattention determining device 10 of the embodiment, the non-inattention determination range is changed in the curve direction by a predetermined amount (e.g., a predetermined angle θ), when the sight line direction of the driver deviates from the non-inattention determination range on the curve direction side, at the timing before the behavior of the vehicle is changed and the turning direction of the vehicle is changed to the curve direction. Accordingly, it is possible to change the non-inattention determination range at the proper timing. Accordingly, it is possible to prevent the inattention determining device from erroneously determining that the state where the driver visually checks the turning direction of the curve is the inattention state, at the timing before the vehicle enters the curve to the front. In addition, it is possible to improve precision of determination whether or not the driver is in the inattention state.

When the steering angle of the steering wheel or the real steering angle (wheel steering angle) according to the steering angle is equal to or more than a predetermined value, the determination whether or not the driver is in the inattention state is discontinued, and the erroneous determination is prevented from occurring when possibility that the sight line direction is greatly changed by an external view operation of the driver is high. In addition, it is possible to improve precision of determination whether or not the driver is in the inattention state.

By displaying a predetermined image representing the positions of the gaze point of the driver and the reference point calculated by the reference point calculating unit 30 on the front window W, the driver can recognize whether or not the non-inattention determination range for determining the inattention state of the driver according to whether or not there is a curve is changed. Accordingly, it is possible to prompt visual guidance to a proper viewing position at the time of entering the curve and passing through the curve.

The inattention determining device 10 according to the embodiment may be applied to an alarm device of a vehicle. Specifically, when the inattention determining device 10 determines that the driver is inattentive, the alarm device of the vehicle alarms the driver through various alarm devices such as a haptic transmission alarm device, a visual transmission alarm device, and an auditory transmission alarm device.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What claimed is

1. An inattention determining device comprising:
    an imaging unit which captures an image of a face of a driver in a vehicle and outputs a face image;
    a sight line direction detector which detects a sight line direction of the driver from the face image and outputs a sight line detection result;
    an inattention determining unit which determines that the driver is in an inattention state when the sight line direction of the sight line detection result is out of a first predetermined range;

an information acquiring unit which acquires information of driving behavior including a turning direction of the vehicle and outputs a driving behavior acquisition result;

a range changing unit which changes the first predetermined range to a second predetermined range by a predetermined amount on the basis of the driving behavior acquisition result; and a curve detector which detects an existence of a curve to the front within a predetermined distance from the vehicle and a curve direction of the curve, and outputs a curve detection result, wherein when the curve detection result is output from the curve detector, the range changing unit changes the first predetermined range to the second predetermined range by the predetermined amount in the curve direction before the turning direction of the driving behavior acquisition result is changed in the curve direction of the curve detection result, and wherein the inattention determining unit determines whether or not the driver is in the inattention state on the basis of the second predetermined range.

2. The inattention determining device according to claim 1, wherein when the curve detection result is output from the curve detector, the range changing unit changes the first predetermined range to the second predetermined range before the turning direction of the driving behavior acquisition result is changed in the curve direction of the curve detection result and when the sight line direction of the sight line detection result is directed from the first predetermined range to the outside of the first predetermined range on the curve direction side.

3. The inattention determining device according to claim 1, wherein the information acquiring unit further acquires the information of the driving behavior including a wheel steering angle of the vehicle and outputs a wheel steering angle acquisition result, and wherein when the wheel steering angle of the wheel steering angle acquisition result is equal to or more than a predetermined value, the inattention determining unit discontinues determining whether or not the driver is in the inattention state.

4. The inattention determining device according to claim 1, further comprising:

a display which displays a predetermined image on a windshield of the vehicle;

a position estimating unit which estimates a relative position of the vehicle with respect to the curve and outputs an estimation result when the curve detection result is output; and a reference point calculating unit which calculates a reference point for the driver to view on the windshield of the vehicle on the basis of the curve direction of the curve detection result and the relative position of the vehicle and outputs a calculation result, wherein the display displays the predetermined image representing the reference point of the calculation result when the curve detection result is output.

5. The inattention determining device according to claim 4, wherein the reference point calculating unit calculates a contact point between a line that passes through the relative position of the vehicle and an inner circumference of the curve and defines the contact point as the reference point.

6. The inattention determining device according to claim 2, wherein the information acquiring unit further acquires the information of the driving behavior including a wheel steering angle of the vehicle and outputs a wheel steering angle acquisition result, and wherein when the wheel steering angle of the wheel steering angle acquisition result is equal to or more than a predetermined value, the inattention determining unit discontinues determining whether or not the driver is in the inattention state.

7. The inattention determining device according to claim 2, further comprising:

a display which displays a predetermined image on a windshield of the vehicle;

a position estimating unit which estimates a relative position of the vehicle with respect to the curve and outputs an estimation result when the curve detection result is output; and a reference point calculating unit which calculates a reference point for the driver to view on the windshield of the vehicle on the basis of the curve direction of the curve detection result and the relative position of the vehicle and outputs a calculation result, wherein the display displays the predetermined image representing the reference point of the calculation result when the curve detection result is output.

8. The inattention determining device according to claim 7, wherein the reference point calculating unit calculates a contact point between a line that passes through the relative position of the vehicle and an inner circumference of the curve and defines the contact point as the reference point.

* * * * *